United States Patent [19]

Takatori et al.

[11] Patent Number: 4,499,480

[45] Date of Patent: Feb. 12, 1985

[54] LIQUID JET RECORDING DEVICE

[75] Inventors: Yasushi Takatori, Sagamihara; Yasuhiro Yano, Kawasaki; Yoshifumi Hattori, Yamato, all of Japan

[73] Assignee: Canon Kabushiki Kaisha, Tokyo, Japan

[21] Appl. No.: 421,424

[22] Filed: Sep. 22, 1982

[30] Foreign Application Priority Data

Oct. 13, 1981 [JP] Japan .............................. 56-163645
Nov. 13, 1981 [JP] Japan .............................. 56-163646

[51] Int. Cl.[3] ........................................ G01D 15/18
[52] U.S. Cl. ........................................ 346/140 R
[58] Field of Search .............................. 346/140

[56] References Cited

U.S. PATENT DOCUMENTS 3,466,659 9/1969 Ascoli .............................. 346/75
3,988,745 10/1976 Sultan .............................. 346/140
4,353,079 10/1982 Kawanabe .............................. 346/140

*Primary Examiner*—Joseph W. Hartary
*Attorney, Agent, or Firm*—Fitzpatrick, Cella, Harper & Scinto

[57] ABSTRACT

A liquid jet recording device comprises a liquid discharging portion, a driving control portion, a connecting wiring portion and a matrix wiring portion, and these are mounted on one substrate. The liquid jet recording device preferably has a substantially uniform roughness at the peripheral surfaces of the orifices of a value of $0.5\mu$ or less.

9 Claims, 16 Drawing Figures

LIQUID JET RECORDING DEVICE

BACKGROUND OF THE INVENTION

1. Field of the Invention

This invention relates to a liquid jet recording device, and particularly to a novel liquid jet recording device of a high density multi-orifice type.

2. Description of the Prior Art

Liquid jet methods are highlighted in these days, because they are capable of high speed recording with very little, or even negligible, noise generation at the time of recording, and also because recording is possible on so called plain paper without any specific treatment of fixation.

Among them, for example a liquid jet recording method as disclosed in German Laid-open specification (DOLS) No. 2843064 has a specific feature different from other methods in which heat energy is permitted to act on a liquid to obtain a driving force for discharging of liquid droplets.

That is, the recording method disclosed in DOLS No. 2843064 is specific in that a liquid which has received the action of heat energy will undergo a change of state accompanied by an abrupt increase of volume, whereby the liquid is discharged by the active force based on the change of state through the orifice at the tip of the recording head portion to form flying droplets, and the droplets are then attached on a recording member to effect recording.

In particular, the liquid jet recording method as disclosed in the DOLS No. 2843064 specification can be very effectively applied to the so called drop on demand recording method, and furthermore it can be used to realize a recording head portion made into a high density multi-orifice of full-line type, thus providing images of high resolution and high quality at a high speed.

The recording head portion in the device to be applied with the above recording method is provided with a liquid discharging portion, having orifices provided for discharging a liquid, liquid channels communicating with the orifices and constituted partly of heat acting portions which are parts at which heat energy acts on liquid for discharging liquid droplets and an electrothermal transducer as a means for generation of heat energy.

The electrothermal transducer is provided with a pair of electrodes and a heat-generating resistance layer which is connected to these electrodes and has a heat-generating region (heat-generating portion) between these electrodes.

As described above, according to the liquid jet recording method disclosed in the DOLS, it is highly probable to realize a liquid jet recording device of full-line type made into a high density multi-orifice, but there are not a few problems before manufacturing such a device as commercial product.

For example, when the orifice density is 8 pieces/mm with a full line of the shorter side of A4 size, namely a full line type of 210 mm, the orifice number is 1680, and electrothermal transducers are also required to be provided in equal number at high density, thereby giving arise to some points to be solved with respect to reliability of the device, productivity and mass production. Also, 1680 orifices are required to be worked with a very high working technique and have a very high precision in order to control the flying direction, flying speed as well as sizes of liquid droplets discharged from respective orifices as desired. Further, at present it is demanded that compactness of the device per se and lowering of failure probability should also be satisfied.

On the other hand, in order to obtain an image of high quality in recording by means of a liquid jet recording device of a high density multi-orifice type as described above, the following three conditions with respect to uniformity are required to be provided:

(1) Uniformity in size of liquid droplets discharged repeatedly through the same orifice as well as uniformity in size of liquid droplets between orifices should be high.

(2) Uniformity in flying direction between orifices should be high.

(3) Uniformity in the discharging speed of liquid droplets discharged repeatedly through the same orifice as well as uniformity in liquid droplet discharging speed between orifices should be high.

In this respect, there remains room for improvement of the multi-orifice type liquid jet recording device of the prior art.

SUMMARY OF THE INVENTION

The present invention has been accomplished in view of the above points and its primary object is to provide a liquid jet recording device of a high density multi-orifice type which is high in reliability, productivity and mass production capability and can also be made into a compact size.

Another object of the present invention is to provide a liquid jet recording device capable of producing an image having good image quality without image irregularity, image disturbance or image failure.

Still another object of the present invention is to provide a liquid jet recording device capable of performing recording without generation of contamination or jamming at the liquid discharging portion by feeding of papers between the orifices to give good recording images.

According to the present invention, there is provided a liquid jet recording device which comprises a liquid discharging portion provided with a number of discharging orifices for formation of flying liquid droplets by discharging a liquid and electrothermal transducers which are arranged each for corresponding discharging orifices along the liquid channels communicating with said corresponding discharging orifices, respectively; a driving control portion for driving respective electrothermal transducers at the liquid discharging portion; a connecting wiring portion for electrical connection of respective electrothermal transducers to the driving control portions; and a matrix wiring portion for sending signals to the driving control portions, and said liquid discharging portion, said driving control portion, said connecting wiring portion and said matrix wiring portion being mounted on one substrate.

According to another aspect of the present invention, there is provided a liquid jet recording device with a substantially uniform roughness at the peripheral surfaces of the orifices of a value of 0.5$\mu$ or less.

DESCRIPTION OF THE PREFERRED EMBODIMENTS

Figure 1:
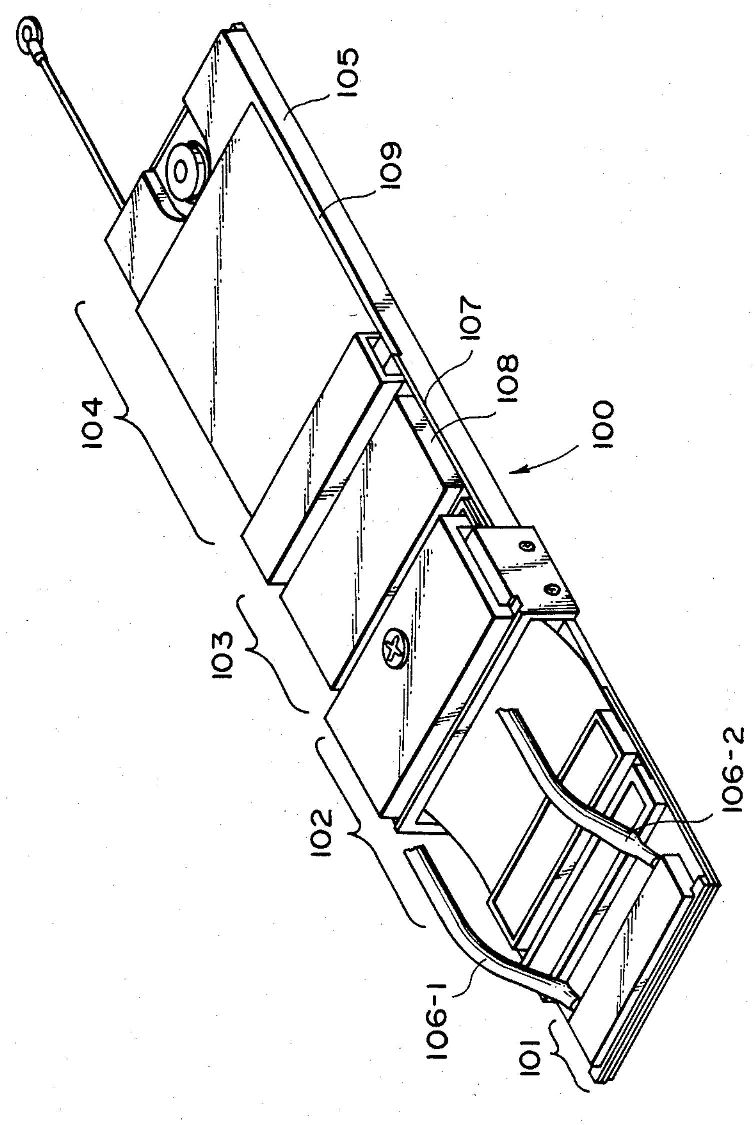
FIG. 1 is a schematic perspective view showing the construction of a preferred embodiment of the liquid jet recording device of the present invention.

Referring now to the drawings, the present invention will be explained in detail.

In FIG. 1 there is shown a preferred embodiment of the liquid jet recording device according to the present invention.

The liquid jet recording device 100 shown in FIG. 1 is constructed of a liquid discharging portion 101, a connecting wiring portion 102, a driving control portion 103 and a matrix wiring portion 104 arranged on a sheet of the common board 105. To the liquid discharging portion 101, there are connected supply tubes 106-1, 106-2 for supplying a liquid to said liquid discharging portion 101 from a liguid storage tank (not shown). The driving control portion 103 consists of a driving control circuit 108 provided on a board 107 for driving control portion and is fixed firmly on the common board 105. The matrix wiring portion 104 consists of a matrix wiring circuit provided on the surface of a board 109.

Figure 2A:
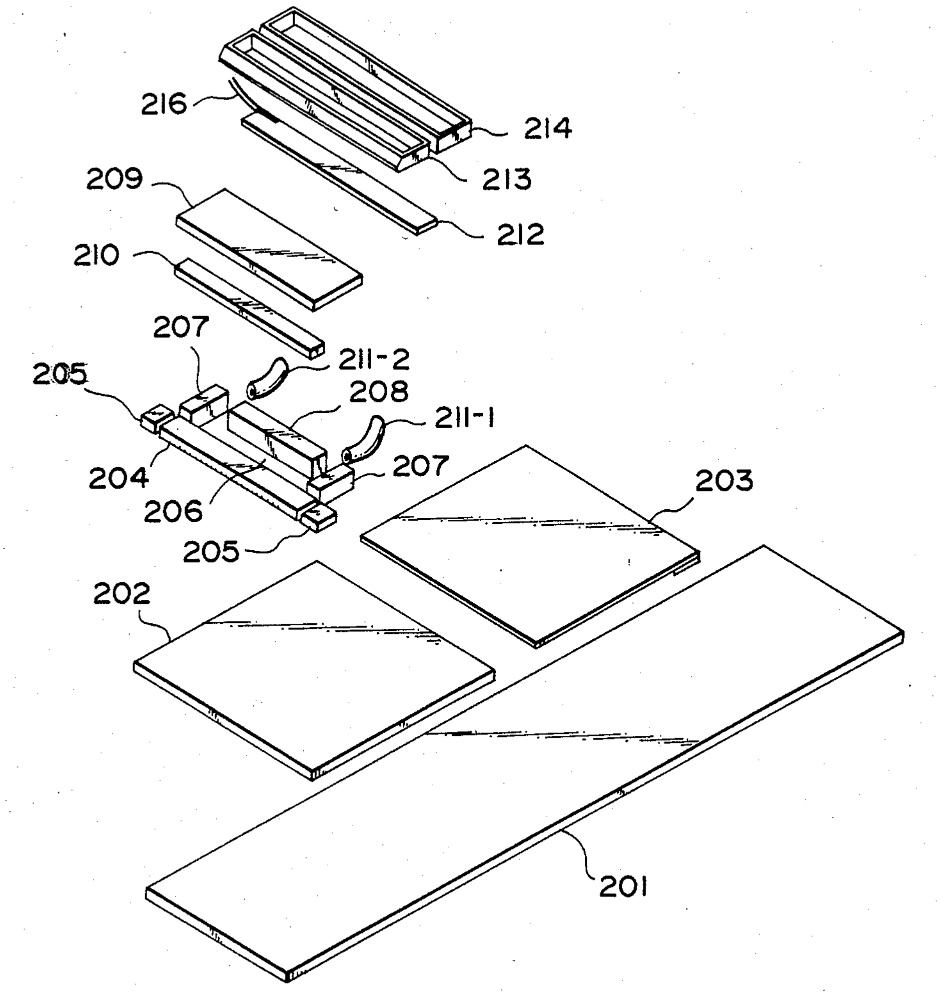
FIG. 2A, FIG. 2B and FIG. 2C are for illustration of the front part of the device shown in FIG. 1, FIG. 2A being a schematic exploded view, FIG. 2B a schematic perspective view of the assembled front part and FIG. 2C a schematic cross-sectional view.
Figure 2B:
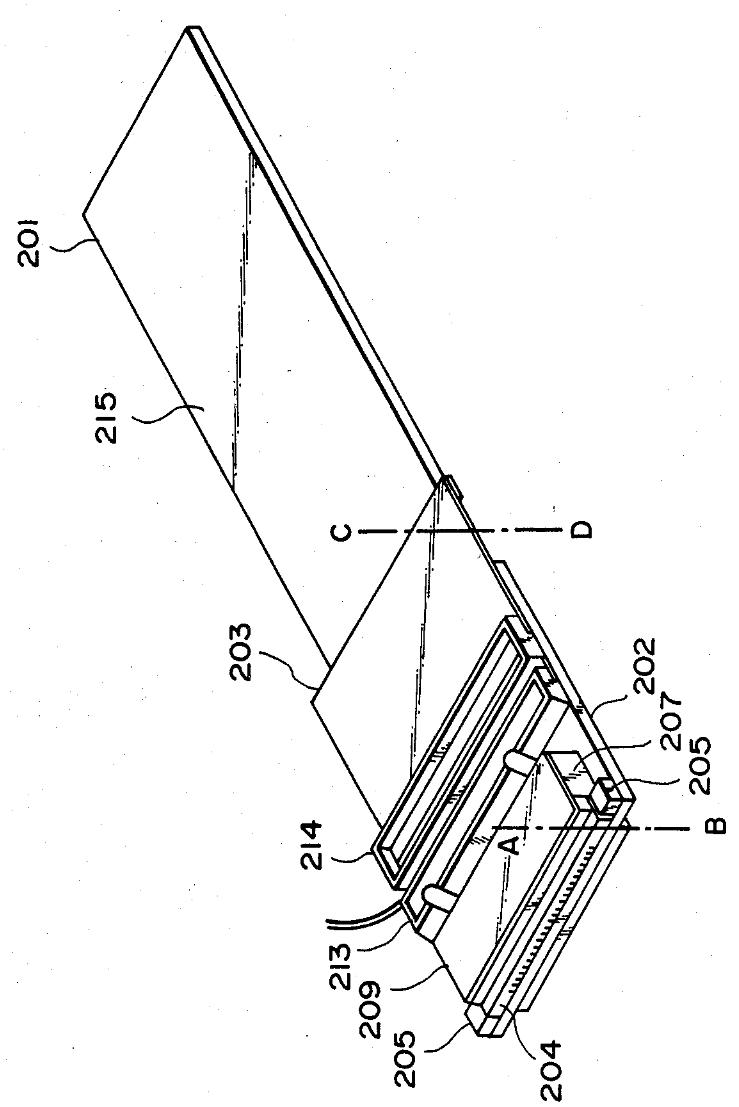
Figure 2C:
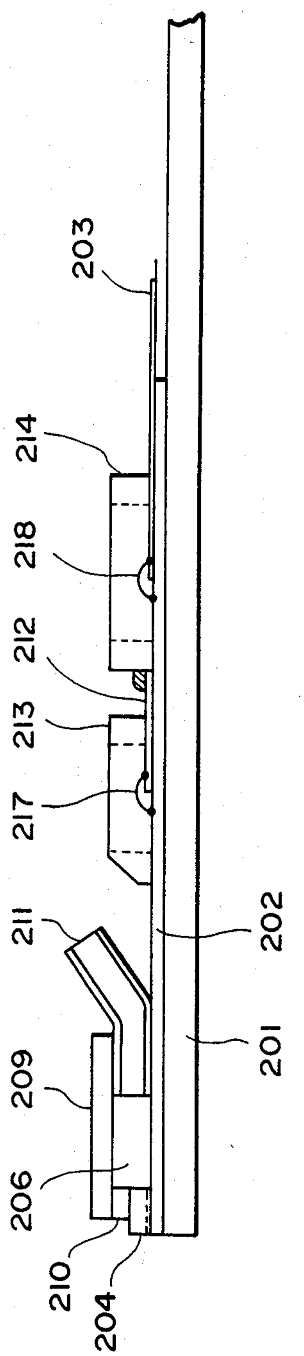

FIGS. 2A, 2B and 2C are set forth for illustrating in detail the front portion (liquid discharging portion and connecting wiring portion) of the device shown in FIG. 1.

FIG. 2A is a schematic exploded view, FIG. 2B is a schematic perspective view of the assembled state, and FIG. 2C is a schematic cross-sectional view cut by the plane including the broken lines AB and CD in FIG. 2B.

The liquid discharging portion and the connecting wiring portion are constructed of a head substrate 201, a heater substrate 202 on the surface of which there are formed a number of electrothermal transducers (not shown), a signal input wire portion 203 to be joined to the selective electrodes of respective electrothermal transducers, grooved plates 204, a shoulder plate 205, a sleeve plate 207, a backing plate 208, a ceiling plate 209, a superposing plate 210, an ink supply tube 211, a common electrode plate 212 and frames 213, 214 for protection of the connecting portion.

The head substrate 201 is a plate with good flatness of, for example 1 mm in thickness, 27 mm in width and 122 mm in length, and aluminum is primarily used as the material therefor. It is also possible to use a flat plate of a metal or an alloy such as Fe, stainless steel, brass, copper, silicon, and the like, an inorganic compound such as alumina, silica, glass, and the like, a polymeric compound such as acrylic resin, polyvinyl chloride, epoxy resin, polycarbonate, ABS, and the like or a surface treated flat plate (e.g. plating, enamel).

The heater substrate 202 may have, for example, a thickness of 0.4 mm, a width of 28 mm and a length of 28 mm, and is made primarily of silicon wafer. It is also possible to use alumina, glass or a metal plate applied with a surface insulating treatment, preferably in the form of a flat plate with good flatness.

The grooved plate 204 may have, for example, a thickness of 0.7 mm, a width of 24 mm and a length of 1.5 mm, and 132 grooves each having a width of 50$\mu$, a depth of 50$\mu$ and a length of 1.5 mm are formed thereon at a density of 8 grooves/mm. Glass is primarily used as the material for this plate because of thermal and chemical stabilities and also permit observation within the grooves, but other inorganic materials such as alumina, silica, silicon, and the like and polymeric compounds with good ink resistance and heat resistance (e.g. epoxy resin) may also be used.

The shoulder plates 205 may each have, for example, a thickness of 0.7 mm, width of 1.5 mm and a length of 1.5 mm, and they are mounted for the purpose of reinforcement of the structure around the common liqiud chamber and the heater substrate 202. The shoulder plates 205 may not be necessarily mounted when the grooved plate 204 has a sufficient width equal to that of the heater substrate 202. As the material for the shoulder plates, there may be primarily employed glass, but it is also possible to use metals or alloys such as aluminum, iron, stainless steel, brass, and the like, inorganic compounds such as alumina, silica, and the like, and polymeric compounds such as epoxy resin, ABS, and the like. For formation of the ink relay chamber (common liquid chamber) 206 for supplying ink to 132 liquid channels (nozzles) as shown in FIG. 2A and FIG. 2C, there are provided sleeve plates 207 (each 1.3 mm in thickness, 2.0 mm in width, 5.0 mm in length), a backing plate 208 (1.3 mm in thickness, 17.0 mm in width, 2.0 mm in length), a ceiling plate 209 (0.7 mm in thickness, 24.0 mm in width, 6.0 mm in length) and a superposing plate 210 (0.6 mm in thickness, 24.0 mm in width, 1.0 mm in length).

The superposing plate 210 is provided for adjustment of the heights of the ink relay chamber 206 (common liquid chamber) and the grooved plate 204 and therefore it is not necessary when the grooved plate 204 has a thickness of about 1.3 mm. The sleeve plates 207, the backing plate 208, the ceiling plate 209 and the superposing plate 210 may be integrally formed of the same material. As the material for these plates, glass is primarily employed, but it is also possible to use other inorganic compounds such as alumina, silica, and the like, metals such as aluminum, iron, copper and the like which are chemically stabilized by surface treatment by plating, enamel finishing, resin coating, and the like, stainless steel, or polymeric compounds such as epoxy resin, polycarbonate resin, silicone resin, ABS resin, acrylic resin, polytetrafluoroethylene, and the like.

For introducing the ink to be led through the pipe from the ink tank into the ink relay chamber 206, the ink supply tubes 211-1 and 211-2 are employed.

The ink supply tubes 211-1 and 211-2 may have, for example, an inner diameter of 1.0 mm, an outer diameter of 1.3 mm and a length of 6 mm and are curved at an angle of about 30° to 45° from the central portion thereof, as shown in FIG. 2C. As the material for these tubes, stainless steel is primarily employed, but it is also possible to use metal tubes treated by plating, enamel finishing or resin coating, glass tubes or various polymeric compounds so long as they are mechanically strong and do not denature the ink.

The ink supply tubes 211-1 and 211-2 may also be considered as a part of the ink relay chamber 206, and they may also be integrally made at the time of molding the sleeve plates 207, backing plate 208, the ceiling plate 209 and the superposing plate 210 as parts thereof.

The common electrode plate 212 is provided for the purpose of connecting the common electrodes corresponding to the respective liquid channels on the heater substrate 202 by means of the wire bonding 217 to be made into the same electrode, as shown in FIG. 2C. As the common electrode plate 212, there may be primarily employed an aluminum plate provided with a gold plating having, for example, a thickness of 0.3 mm, a width of 28.0 mm and a length of 4.0 mm. Other materials may also be available, if they are provided, on the surface or the whole portion, with a material of Au or Al capable of wire bonding produced by gold plating or aluminum vapor deposition. The common electrode plate 212 is also joined with a lead wire 216 by way of such a method as soldering, etc.

Figure 3A:
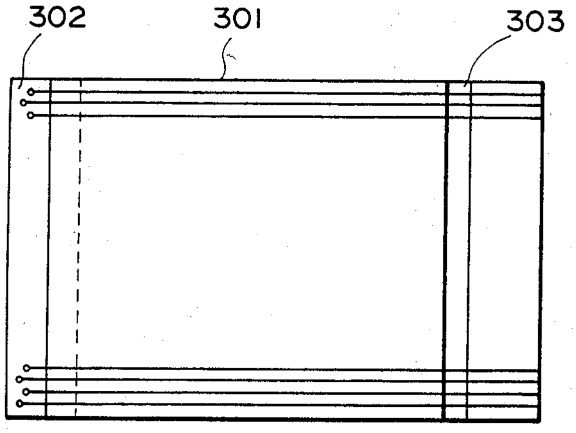
FIG. 3A, FIG. 3B and FIG. 3C are each a schematic illustration of a signal input wiring portion.
Figure 3B:
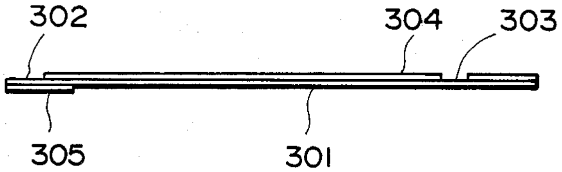
Figure 3C:
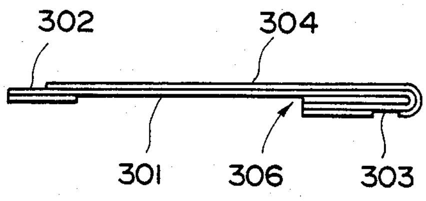

The signal input wire portion 203 is a lead portion provided for input of the signal to the individual electrode portions on the heater substrate, as detailed in FIGS. 3A, 3B and 3C. FIG. 3A is a view as viewed from above, FIG. 3B is a sectional view of FIG. 3A and FIG. 3C is the form in use. As the material, there may be employed a polyimide film 301 having a copper foil laminated on its surface with, for example, a thickness of 0.06 mm, a width of 27.6 mm and a length of 34 mm.

The copper foil portion is subjected to patterning in number of the individual electrodes, and the pad portion 302 and the pressure contacted portion 303 are subjected to gold plating. Other portions are coated with a cover film 304. The pad support portion 305 is used for reinforcement of the pad electrode portion 302 and is made primarily of a copper foil. The signal input portion 203 is used finally in the form as shown in FIG. 3C. That is, the pressure contacted portion 303, after it has been bent, is positioned on the side opposite to the pad portion 302 with a polyimide film, or glass epoxy composite 306 interposed and adhered with an adhesive therebetween.

The pad portion 302 is adhered to the heater substrate 202 and connected by the wire bonding 218 as shown in FIG. 2C, and the individual electrodes corresponding to the respective nozzles are drawn out to the pressure contacting portion 303 on the signal input wiring portion 203. The frames 213, 214 as shown in FIG. 2 are both provided for the purpose of protection of the wire bonding portions. Also, for further mechanical and chemical protection of the bonding portions, the frame may be filled with a protective resin (primarily, silicone resin or epoxy resin).

The frames 213, 214 may also be provided with lids, which are not shown in the drawing. The frames 213, 214 may be made of a polymeric compound such as polycarbonate resin, epoxy resin, acrylic resin, and the like, or an inorganic compound such as glass, silica, alumina, and the like.

Figure 4B:
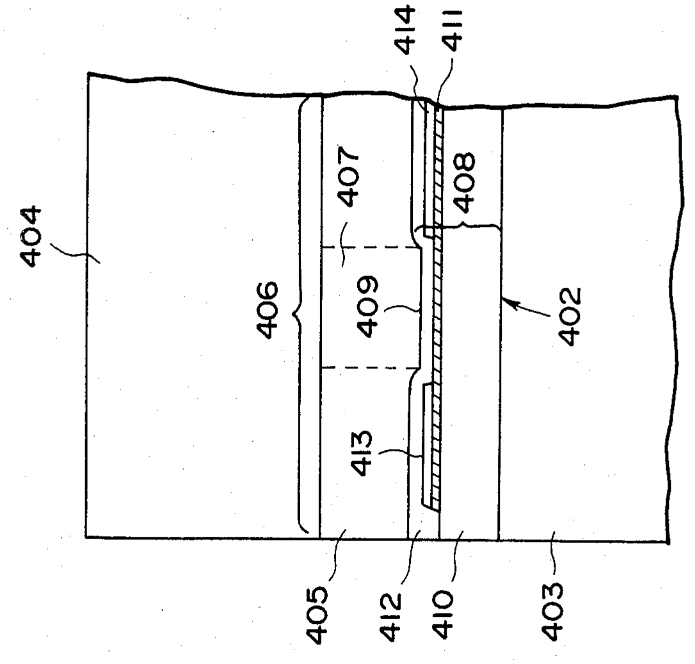
FIG. 4A and FIG. 4B are for illustration of the constitution of a liquid discharging portion, FIG. 4A showing a partial front view and FIG. 4B a cross-sectional view.
Figure 4A:
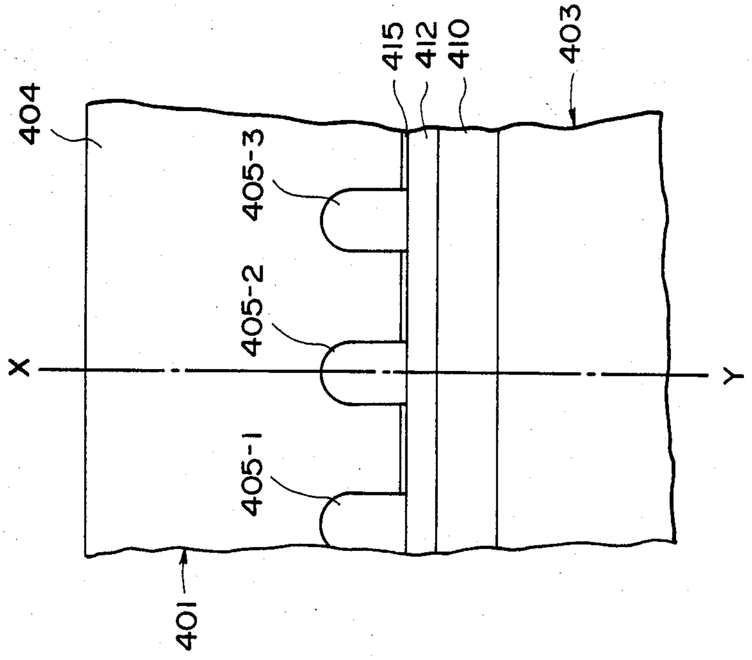

FIG. 4A is a partial front view from the orifice side for showing a preferred embodiment of the liquid discharging portion of the liquid jet recording device according to the present invention. FIG. 4B is a partial cross-sectional view taken along the dot and dash line XY as shown in FIG. 4A.

The liquid discharging portion 401 as shown in the drawing has a structure having orifices 405 and the liquid channel portions 406 formed by joining the grooved plate 404 provided with a predetermined number of grooves with predetermined widths and depths at a certain line density with the substrate 403 provided with electrothermal transducers 402 so that the grooves may cover the electrothermal transducers (Joining layers are designated as 415).

The liquid channel portions 406 have the orifices 405 for discharging the liquid at their terminal ends, and the heat acting portions 407 which will generate bubbles by action of the heat energy generated from the electrothermal transducers 402 on the liquid thereby to cause an abrupt change in state by expansion and shrinkage of its volume.

The heat acting portions 407 are positioned above the heat generating portions 408 of the electrothermal transducers 402, with the heat acting faces 409 contacted with the liquid of the heat generating portions 408 and being the bottom portions of the latter.

The heat generating portion 408 is constructed of a lower layer 410 provided on the substrate 403, a heat-generating resistance layer 411 provided on the layer 410 and an upper layer 412 provided on the heat-generating resistance layer 411. The surface of heat resistance layer 411 is provided with electrodes 413, 414 for passage of current to layer 411 for generation of heat. The electrode 413 is the electrode common to the heat generating portions of respective liquid discharging portions, and the electrodes 414 are selective electrodes for generation of heat by selection of the heat generating portions of respective liquid discharging portions. The selective electrodes are provided along the liquid channels of the liquid discharging portions.

Figure 5:
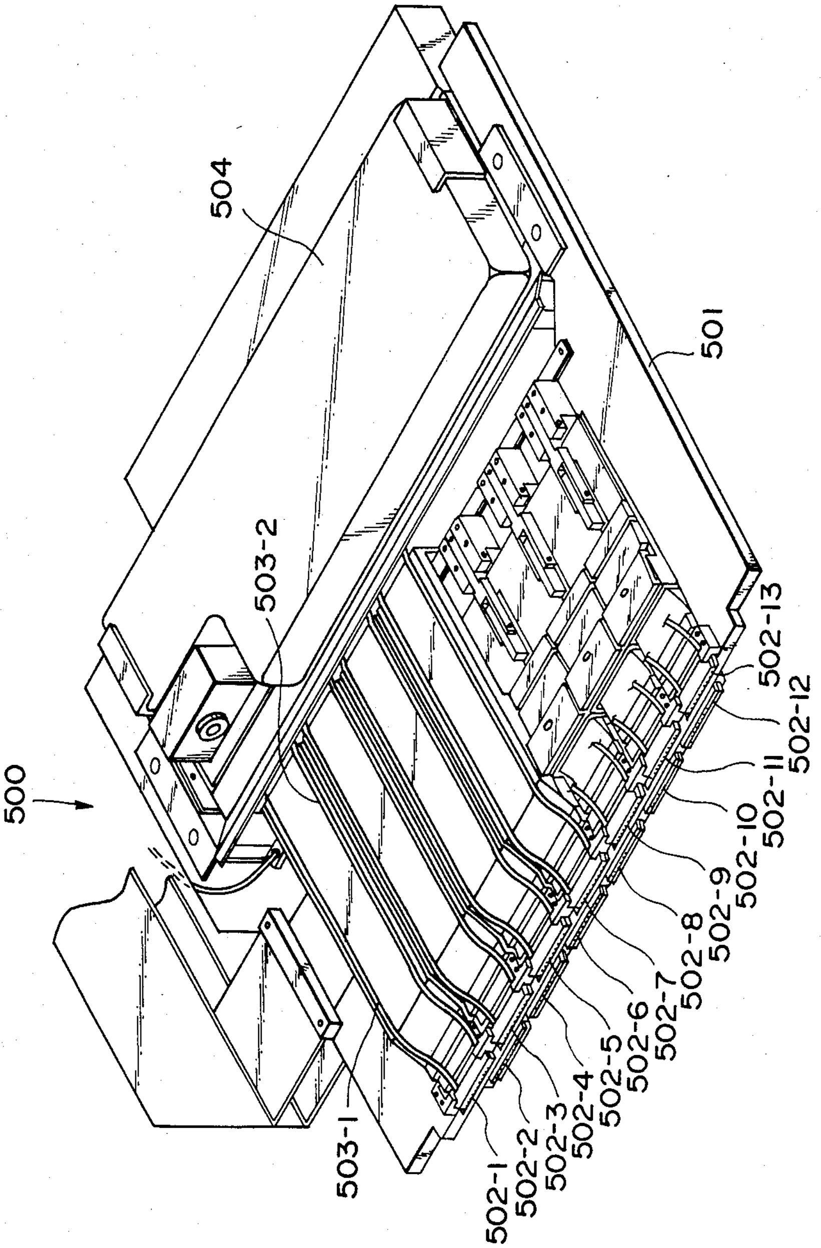
FIG. 5 is a schematic perspective view showing a second embodiment.

FIG. 5 shows a liquid jet recording device 500 of a full-multi-arrayed type of A4 size. With the liquid jetting device as shown in FIG. 1 as one unit, 13 units in all are provided on both surfaces of a full-multi substrate 501 (6 units on the lower side, 7 units on the upper side).

Each of the liquid jetting device units 502-1 through 502-13 is connected through the ink supply tubes 503-1, 503-2 (in the drawing, only the ink supply tubes of unit 502-1 are marked with reference characters, for clarity) to the common ink tank 504 so as to supply ink from the ink tank to each unit.

Figure 6A:
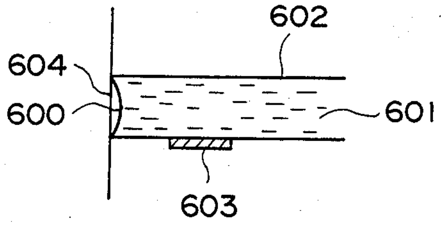
FIG. 6A through FIG. 6D are schematic views for illustration of the states of liquid droplet discharging by the recording method using the liquid jet recording device according to the present invention.
Figure 6B:
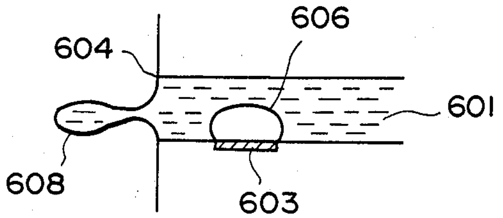
Figure 6C:
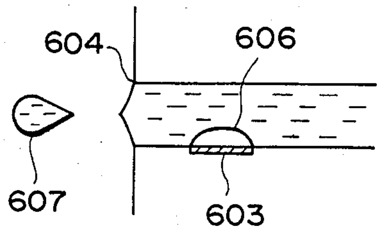
Figure 6D:
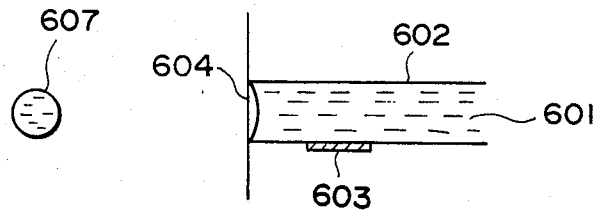

Next, the state of the liquid droplet discharging according to the drop on demand recording method by use of the liquid jet recording device of the present invention is schematically shown in FIG. 6A to FIG. 6D. FIG. 6A shows the state in which the ink 601 is filled in the nozzle 602 with a meniscus 600. In the nozzle 602, there is also placed an electrothermal transducer 603 for releasing heat energy by signal input. In FIG. 6B, a signal is put into the electrothermal transducer 603 to release heat energy, whereby said energy is transmitted to the ink 601 to generate abruptly the bubble 606 and the ink ahead of the electrothermal transducer 603 is ejected from the orifice 604 by the pressure generated by the bubble 606 to from a liquid column 608. In FIG. 6C, the signal input into the electrothermal transducer 603 is turned off, the bubble 606 is shrink with lowering in temperature of said transducer 603 and the ejected liquid column 608 is cut at the tip portion through shrinkage, and the liquid droplet 607 is now under formation. In FIG. 6D, the bubble has completely disappeared and the ink is refilled in the nozzle 602 completely to the portion of the orifice 604.

Figure 7A:
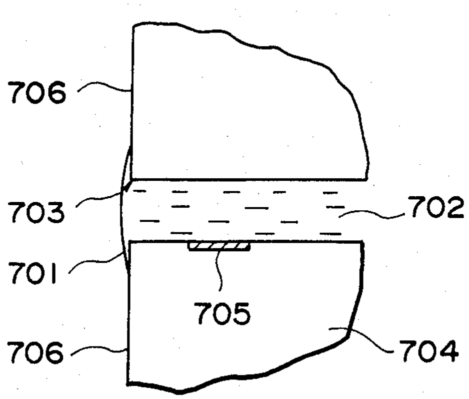
FIG. 7A and FIG. 7B are schematic views of comparative examples.

In order that formation of the flying droplets as illustrated above with reference to FIG. 6A to FIG. 6D may be effected stably with uniform droplet sizes at uniform flying speeds, the surface roughness at the peripheral portion of the orifice relative to ink is critical. That is, as shown in FIG. 7A, when the orifice face 706 is too rough, the ink 702 oozes out around the orifice 703 to from a light film 701.

Figure 7B:
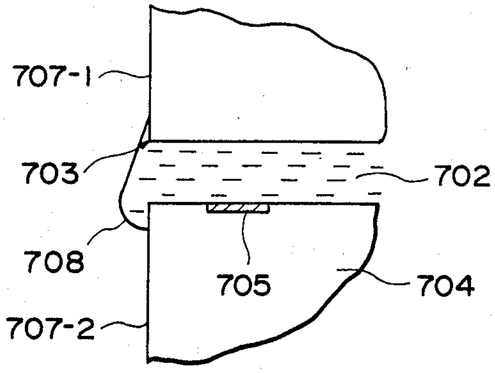

In such a state, when continuous signals are put into the electrothermal transducer 705 provided in the heater substrate 704 to form continuous flying liquid droplets, the so called nonuniform droplet size phenomenon is liable to occur in which only the first liquid droplet is large, and the second and sequential droplets are small. Depending on the size of the liquid film 701, the droplet sizes may also differ or the droplet flying speed will differ depending on the affinity of the liquid film 701 for the orifice face 706. In FIG. 7B, the orifice faces 707-1, 707-2 are too rough with different roughness at the upper and lower portions. In this case, a liquid pool 708 is formed, whereby the liquid column (not shown) protruded out from the orifice is protruded in a direction not perpendicular to the nozzle and the flying direction of the droplet will, of course, be adversely affected thereby.

The present inventors have found that the inconvenience described above is overcome by selecting the face roughness of the orifice which is substantially uniform and 0.5μ or less, preferably 0.2μ or less, and there can be obtained an ink jet recorded image of good image quality. By use of a recording head provided with an orifice face having such a surface roughness, there can be obtained a recorded image of good image quality without image irregularity. Moreover, the distance between paper and orifice can be sufficiently taken, and therefore, there can be removed such unstable factors as contamination or clogging of the head with paper powders and paper jamming within the paper supplying route, whereby maintenance around the head is very easy.

The present invention is further described below by referring to Examples of the liquid jet recording device of the present invention, in which the surface roughness at the peripheral surface of the orifice is made uniform within above numerical range.

EXAMPLE 1

Four multi-orifice heads (Samples A, B, C, Comparative sample) were prepared, as shown in FIGS. 2A, 2B and 2C, by joining grooved plates 204 each having 128 grooves having a width of 50μ, a depth of 50μ, a pitch of 125μ and a length of 1.5 mm with heater substrates 202 each having an electrothermal transducer with the same pitch as the groove and having an area of 4μ×200μ. Each orifice face was formed by cutting in the direction perpendicular to the nozzle and the heater substrate face by rotation of a circular blade having a diamond grain sizes as shown in the Table below.

When droplet discharging tests (driving frequency: 1 KHz, pulse width: 10 μsec, orifice-paper distance: 2.5 mm) were conducted using the cut face (orifice surface) roughnesses and the abovedescribed multi-head orifice heads, the multi-orifice heads according to the present invention were found to form good images.

| | Comparative example | Examples of the present invention A | B | C |
|---|---|---|---|---|
| Diamond grain size: | #240 | #320 | #800 | #1200 |
| Orifice surface roughness: | 0.7≅ | 0.5–0.2 | 0.2–0.10 | 0.10–0.01 |
| Image quality: | Great disturbance | Substantially no disturbance | Good | Very good |

EXAMPLE 2

The head of the comparative example of Example 1 was subjected to lap polishing to an orifice surface roughness of 0.2–0.1μ. As the lap solution, there was employed a 1/1 mixture of Alundum particles of #800 and water.

After polishing, the droplet discharing tests were conducted under the same conditions are in Example 1 to obtain a good image quality.

As described above, a recording head with an orifice face formed to a roughness of 0.5μ or less, preferably 0.2μ or less, can give discharged liquid droplets with very uniform droplet size, flying direction and discharging speed, whereby there can be obtained liquid jet recording images of good image quality.

Further, the multi-orifice head with uniform orifice roughness as described above can give uniform flying direction and uniform droplet discharging speed and therefore the orifice-paper distance (distance between orifice and paper) can be made greater than the prior art examples, whereby movement of the head as well as that of the recording paper can be maintained safely and inconveniences such as contamination of the head or jamming of the paper can be removed.

The value of the surface roughness used in the present invention is the "maximum height" obtained by measuring a surface roughness according to JIS (Japanese Industrial Standard) B0601-1976.

The maximum height is measured as shown below.

A standard length is taken out from a cross section curve. The portion thus taken out is sandwiched between two straight lines parallel to an average line. The distance between the two straight lines is measured in the direction of the longitudinal magnification of the cross section curve. The value thus obtained in μ (microns) is that of the surface roughness.

The "cross section curve" as mentioned above is a contour appearing at the cross section formed by cutting a surface to be measured by a plane perpendicular to the average surface of the surface to be measured.

The "standard length" as mentioned above is a predetermined length of the cross section curve taken out for measurement. In the present invention, 0.25 mm is selected as the standard length.

The "average line" as mentioned above is a straight line or curve having a nominal shape of the surface to be measured at the taken-out portion of the cross section curve, and sum of the square of the deviation between said average line and the cross section curve is selected to be minimum.

What we claim is:

1. A liquid jet recording device which comprises a liquid discharging portion including means defining a number of discharging orifices for formation of flying liquid droplets by discharging a liquid, a respective liquid channel communicating with each of said discharging orifices, and electrothermal transducers which are arranged each for a corresponding one of said discharging orifices along a respective one of said liquid channels; respective driving control portions for driving respective ones of said electrothermal transducers of said liquid discharging portion; a connecting wiring portion for electrical connection of respective ones of said electrothermal transducers to the corresponding ones of said driving control portions; a matrix wiring portion for sending signals to said driving control portions; and a substrate; said liquid discharging portion, said driving control portions, said connecting wiring portion and said matrix wiring portion being mounted on said substrate.

2. A liquid jet recording device according to claim 1, further comprising a liquid storage tank and a common liquid chamber connected thereto, and wherein upstream portions of said liquid channels communicate with said common liquid chamber.

3. A liquid jet recording device according to claim 2, further comprising liquid supply means, and wherein said common liquid chamber is interconnected via said liquid supplying means on both sides thereof to said tank.

4. A liquid jet recording device according to claim 1, wherein the surface roughness of the plane at which said discharging orifices are formed is substantially uniform and is 0.5$\mu$ or less.

5. A liquid jet recording device which comprises a plural number of liquid jet recording device units, each comprising a liquid discharging portion including means defining a number of discharging orifices for formation of flying liquid droplets by discharging a liquid, a respective liquid channel communicating with each of said discharging orifices, and electrothermal transducers which are arranged each for a corresponding one of said discharging orifices along a respective one of said liquid channels; respective driving control portions for driving respective ones of said electrothermal transducers of said liquid discharging portion; a connecting wiring portion for electrical connection of respective ones of said electrothermal transducers to the corresponding ones of said driving control portions; and a matrix wiring portion for sending signals to said driving control portions; and a substrate; said liquid discharging portions, said driving control portion, said connecting wiring portion and said matrix wiring portion being mounted on said substrate; and a liquid tank containing a liquid to be supplied to said liquid discharging portions of each said unit, and a common support; and said plural number of liquid jet recording device units and said liquid tank being mounted on said common support.

6. A liquid jet recording device according to claim 5, wherein said support has upper and lower surfaces and wherein the said liquid jet recording units are provided in a staggered arrangement on said upper surface and said lower surface of said support.

7. A liquid jet recording device according to claim 5, further comprising a liquid tank and two liquid supply tubes for each said unit and wherein each said liquid jet recording unit is connected through two said liquid supply tubes to said liquid tank.

8. A liquid jet recording device according to claim 5, further comprising liquid supply tank and a common liquid chamber connected thereto, and wherein upstream portions of said liquid channels communicate with said common liquid chamber.

9. A liquid jet recording device according to claim 5, wherein the surface roughness of the plane at which said discharging orifices are formed is substantially uniform and is 0.5$\mu$ or less.

* * * * *

UNITED STATES PATENT AND TRADEMARK OFFICE
CERTIFICATE OF CORRECTION

PATENT NO. : 4,499,480
DATED : February 12, 1985
INVENTOR(S) : YASUSHI TAKATORI, ET AL.

It is certified that error appears in the above-identified patent and that said Letters Patent is hereby corrected as shown below:

On the Cover Page, under the heading "Foreign Application Priority Data", for the reference no. 56-163646, change "Nov. 13, 1981" to --Oct. 13, 1981--.

Column 1, line 58, after "as" insert --a--; and line 64, change "arise" to --rise--.

Column 2, line 9, change "provided" to --met--.

Column 3, line 37, after "for" insert --the--; line 56, change "a shoulder plate" to --shoulder plates--; lines 56-57, change "a sleeve plate" to --sleeve plates--; and line 58, change "an ink supply tube" to --ink supply tubes--.

Column 4, line 15, after "also" insert --to--; and line 23, change "liqiud" to --liquid--.

Column 6, line 60, change "from" to --form--; and line 62, change "shrink" to --shrunk--.

Column 7, line 8, change "from" to --form--; line 61, change "sizes" to --size--; and line 66, change "abovedescribed" to --above-described--.

UNITED STATES PATENT AND TRADEMARK OFFICE
CERTIFICATE OF CORRECTION

PATENT NO. : 4,499,480

DATED : February 12, 1985

INVENTOR(S) : YASUSHI TAKATORI, ET AL.

It is certified that error appears in the above-identified patent and that said Letters Patent is hereby corrected as shown below:

Column 8, line 20, change "discharing" to --discharging--.

Signed and Sealed this

*Ninth* Day of *September 1986*

[SEAL]

*Attest:*

DONALD J. QUIGG

*Attesting Officer* *Commissioner of Patents and Trademarks*